3,365,489
PRODUCTION OF UNSATURATED
ALIPHATIC ACIDS
James Robert Bethell and David James Hadley, Epsom Downs, England, assignors to The Distillers Company Limited, Edinburgh, Scotland, a British company
No Drawing. Application Feb. 18, 1965, Ser. No. 433,777, now Patent No. 3,322,693, dated May 30, 1967, which is a division of application Ser. No. 134,592, Aug. 29, 1961. Divided and this application May 26, 1965, Ser. No. 459,118
Claims priority, application Great Britain, Feb. 17, 1959, 5,396/59; Apr. 15, 1959, 12,881/59, 12,882/59; June 13, 1959, 20,304/59; Sept. 8, 1960, 30,923/60; Sept. 29, 1960, 33,411/60
8 Claims. (Cl. 260—530)

The present invention relates to the production of a catalytic composition particularly for use in the production of unsaturated aliphatic acids such as acrylic acid and a methacrylic acid.

This application is a divisional application of copending application Serial No. 433,777, filed Feb. 18, 1965, now U.S. Patent 3,322,693, which is in turn a divisional application of copending application Ser. No. 134,592, filed Aug. 29, 1961, now abandoned; said application Ser. No. 134,592 being a continuation-in-part of copending application Ser. No. 4,221, filed Jan. 25, 1960, and of U.S. Patent 3,098,102, issued July 16, 1963.

Application Ser. No. 4,221 describes and claims the process for the production of acrylic acid or methacrylic acid by reacting at an elevated temperature in the vapour phase acrolein or methacrolein or compounds yielding these substances under the reaction conditions, such as propylene, with molecular oxygen over an oxidation catalyst comprising (i) a mixture of the oxides of molybdenum and cobalt, and/or (ii) a compound of molybdenum, cobalt and oxygen, such as cobalt molybdate.

The catalyst for this process can be suitably prepared by precipitating a compound containing cobalt, molybdenum and oxygen by adding ammonia or a nitrogenous base to a mixed solution of cobalt and molybdenum salts, and heating the resulting precipitate.

It has now been discovered that the proportion of ammonia or nitrogenous base added to the mixed solution of cobalt and molybdenum salts is critical and that the best results are obtained when this proportion is maintained within certain limits.

Accordingly the present invention relates to the production of a catalytic composition containing cobalt, molybdenum and oxygen prepared by adding a nitrogenous base to a solution or suspension of a cobalt salt and molybdic acid or a molybdate of a nitrogenous base to obtain a solution of pH less than about 7, and subjecting the resulting precipitate to a heat treatment.

The catalytic composition containing cobalt, molybdenum and oxygen is suitably formed by mixing an aqueous solution of a cationic cobalt salt, such as the nitrate, chloride or acetate, with an aqueous solution or suspension of molybdic acid or a molybdate, adding a nitrogenous base to the aqueous mixture in a proportion say for example between 0.5 and 1.5 gramme-equivalents of base per gramme-atom of cobalt such that the pH of the mixture does not exceed about 7, filtering off drying the resulting precipitate and subjecting it to a heat treatment. The maximum permissible pH values for the solution vary slightly according to the particular base used. As examples the maximum pH values employing ammonia have been found to be about 6.6 to 6.8 and employing ethylene diamine is about 6.4 to 7.2. The lower limit of pH is not critical since the activity of the catalyst does not fall with reduced pH, but final pH values below about 4 are undesirable as the precipitation of the cobalt molybdate is then incomplete and the yield of catalyst is thus diminished. To obtain the maximum quantity of catalyst with the maximum activity the final pH should be about 6–6.5.

Throughout this specification the values of pH quoted have been determined at 60° C. with a glass electrode, measurements being taken 15 seconds after addition of base to the solution of salts. The preferred nitrogenous base is ammonia. In general other suitable nitrogenous bases are those of the type $NH_2R$, $NHR_2$ and $NR_3$ such as the aliphatic amines, ethanolamine, ethylamine, triethylamine, ethylene diamine, aromatic or heterocyclic amines such as aniline, pyridine, cycloaliphatic amines, such as piperidine and compounds such as hydrazine. The temperature at which the precipitation is carried out is not critical, and temperatures between room temperature and about 100° C. are suitable. It is preferred to carry out the precipitation at temperatures above room temperature, as the precipitate produced at these temperatures is more easily filtered.

The atomic ratio of cobalt to molybdenum in the catalyst may vary within moderately wide limits, but should not be substantially greater than 1:1.

As indicated above the catalyst composition may be employed in the process for the production of acrylic or methacrylic acid by the vapour phase reaction of acrolein or methacrolein or compounds yielding these substances under reaction conditions, e.g. propylene, with molecular oxygen.

By maintaining the proportion of base in the critical range set out above, high yields of unsaturated acids, based on aldehyde fed and aldehyde consumed, are obtained. Furthermore the weight of active catalyst obtained in the precipitation step also varied with the proportion of base added, and is at a maximum when the proportion is maintained in the specified range.

The reaction may be carried out in any suitable manner, for instance under isothermal or adiabatic conditions and as a fixed or fludised bed process. The proportion of aldehyde in the feed may vary within wide limits, for example between 1 and 20% by volume, and preferably between about 2 and 10% by volume. The concentration of oxygen in the feed may vary within moderately wide limits, for example between 1 and 20% by volume and preferably 2 and 15% by volume. The molecular oxygen containing gas may be diluted with inert gases, and may be, for example, supplied as air.

The reaction is suitably carried out in the presence, as diluent, of a gas which is substantially inert under the conditions of reaction, for example, nitrogen, propane, butane, isobutane, carbon dioxide and steam. It is preferred to use steam or nitrogen or mixtures thereof. The concentration of the steam may vary within wide limits, for instance between 20 and 60% by volume of the feed.

The reaction is carried out at an elevated temperature, preferably between 300 and 500° C.

The contact time may be for example in the range 1–30 seconds.

The process of the present invention is further illustrated by the following examples. In the examples, parts by weight and parts by volume bear the same relation to each other as do kilogrammes to litres.

*Example 1*

145.5 parts by weight of cobalt nitrate

[$Co(NO_3)_2 \cdot 6H_2O$]

and 88.8 parts by weight of ammonium molybdate [$(NH_4)_6Mo_7O_{24} \cdot 4H_2O$] were dissolved in 320 parts by weight of water at 60° C., 108 parts by weight of a 5.14 N aqueous solution of ammonia, representing 1.15 gramme-equivalents of ammonia per gramme-atom of cobalt, was slowly added over a period of half an hour, and the mixture was stirred for a further 15 minutes. The resultant mixture gave a pH of 5 with a glass electrode under the conditions specified above. The precipitate was filtered off and washed twice by resuspension with 500 parts of distilled water. The precipitate was dried at 110° C. pelleted and heated at 600° C. for 16 hours. 105 parts by weight of catalyst were obtained.

A reactor containing the catalyst was heated in a liquid bath maintained at 361° C. A gaseous mixture of acrolein (10% by volume) nitrogen (50% by volume), oxygen (10% by volume) and steam (30% by volume) was passed over the catalyst, the contact time, defined as volumes of catalyst divided by volumes of reactants at N.T.P. fed per second, being 3.5 seconds. Of the acrolein fed to the reactor, 59.2% was converted to acrylic acid. The yield of acrylic acid based on acrolein consumed was 66.9%.

*Example 2*

A series of catalysts was made up as described in Example 1, but different proportions of ammonia were used in the precipitation step. The catalysts were tested by the method given in Example 1. The results are shown in Table 1.

TABLE 1

| Run No. | Gramme-equivalents of NH₃ per gramme-atom of Co | pH | Parts by weight of catalyst obtained | Percent acrolein fed converted to acrylic acid | Percent yield of acrylic acid based on acrolein consumed |
| --- | --- | --- | --- | --- | --- |
| 1 | 0.5 | 3.6 | 51 | 60.2 | 63.1 |
| 2 | 0.95 | 4.3 | 88.7 | 57.3 | 63.0 |
| 3 | 1.35 | 6.2 | 109 | 64.4 | 66.5 |
| 4 | 1.45 | 6.6 | | 53.9 | 60.1 |
| 5 | 1.5 | 6.8 | | 26.3 | 49.5 |

By way of comparison with the above examples when the process was repeated over a catalyst made up as described in Example 1 except that the proportion of ammonia added in the precipitation step was 1.55 gramme-equivalents per gramme-atom of cobalt, only about 6% of the acrolein fed was converted to acrylic acid, and the yield of acrylic acid based on acrolein consumed was only 30%.

*Example 3*

145.5 parts by weight of cobalt nitrate was dissolved in 60 parts by weight of water at 60° C., and 88.3 parts by weight of ammonium molybdate, powdered to 30 mesh B.S.S. was dissolved in 260 parts by weight of water at 60° C. The two solutions were mixed and maintained at 60° C. with stirring, while 68.4 parts by weight of triethylamine was added over a period of 30 minutes; stirring was continued for a further 15 minutes. The resultant mixture gave a pH of 5.2 with a glass electrode under the conditions specified above. The precipitate was collected and washed twice by resuspension in 333 parts by weight of water. The solid was dried at 110° C. powdered to 30 mesh B.S.S. and pelleted. The catalyst was heat treated at 600° C. for 16 hours.

A gaseous mixture of 9.9% by volume of acrolein, 9.9% volume of oxygen, 50.3% by volume of nitrogen and 30% by volume of steam was passed over the catalyst in a reactor maintained at 400° C., the contact time being 3.6 seconds.

Of the acrolein fed to the reactor 61.6% was converted to acrylic acid, and 19.4% was recovered unchanged. The yield of acrylic acid based on the acrolein consumed was 76.5%.

Employing the above conditions but using catalysts prepared by use of different proportions of base per gramme-atom of cobalt the following results were obtained.

TABLE 2

| Run No. | Gramme-equivalent of ethylene diamine per gramme-atom cobalt | pH | Parts by weight of catalyst obtained | Percent acrolein fed converted to acrylic acid | Percent acrylic acid based on acrolein consumed |
| --- | --- | --- | --- | --- | --- |
| 1 | 0.75 | 3.7 | 54.6 | 65.9 | 73.3 |
| 2 | 1.0 | 3.9 | 95.0 | 57.3 | 70.1 |
| 3 | 1.35 | 5.2 | 105.0 | 60.0 | 66.1 |

*Example 4*

A catalyst was prepared as described in Example 1, except that the concentrations of cobalt, nitrate and ammonium molybdate were reduced to ⅕ of those employed in Example 1. The catalyst, heat treated and tested as described in Example 1, gave a yield of acrylic acid, based on the acrolein consumed, of 72%. Of the acrolein fed to the reactor 61.7% was converted to acrylic acid.

We claim:

1. A process for the production of an unsaturated aliphatic acid selected from the group consisting of acrylic acid and methacrylic acid which comprises reacting at an elevated temperature in the vapour phase a compound selected from the group consisting of acrolein, methacrolein or the corresponding olefins with a molecular oxygen-containing gas over a catalytic composition containing cobalt, molybdenum and oxygen prepared by adding a nitrogenous base to an aqueous composition of a cobalt salt and molybdic acid or a molybdate of a nitrogenous base to obtain a solution of pH less than about 7 and subjecting the resulting precipitate to a heat treatment.

2. A process as claimed in claim 1 wherein the proportion of aldehyde in the reactant is between 1 and 20% by volume.

3. A process as claimed in claim 1 wherein the proportion of oxygen in the reactant feed is between 1 and 20%.

4. A process as claimed in claim 1 wherein the reaction is carried out in the presence of a diluent inert under the reaction conditions.

5. A process as claimed in claim 4 wherein the inert diluent is selected from the group consisting of nitrogen, propane, butane, isobutane, carbon dioxide and steam.

6. A process as claimed in claim 5 wherein the inert diluent is steam employed in proportion between 20 and 60% of the reactant feed.

7. A process as claimed in claim 1 carried out at between 300° and 500° C.

8. A process as claimed in claim 1 wherein the contact time is in the range 1–30 seconds.

References Cited

UNITED STATES PATENTS

| 2,881,212 | 4/1959 | Idol et al. | 260—530 |
| 3,065,264 | 11/1962 | Koch et al. | 260—533 |
| 3,087,964 | 4/1963 | Koch et al. | 260—530 |
| 3,098,102 | 7/1963 | Bethell et al. | 260—533 X |

LORRAINE A. WEINBERGER, *Primary Examiner.*

R. K. JACKSON, *Examiner.*

I. R. PELLMAN, V. GARNER, *Assistant Examiners.*